United States Patent
Lane et al.

(10) Patent No.: US 7,863,832 B2
(45) Date of Patent: Jan. 4, 2011

(54) EQUIPMENT AND METHODS FOR EMERGENCY LIGHTING THAT PROVIDES BROWNOUT DETECTION AND PROTECTION

(75) Inventors: John Evan Lane, Grayson, GA (US); Don Zulim, Conyers, GA (US)

(73) Assignee: ABL IP Holding LLC, Conyers, GA (US)

( * ) Notice: Subject to any disclaimer, the term of this patent is extended or adjusted under 35 U.S.C. 154(b) by 94 days.

(21) Appl. No.: 12/356,641

(22) Filed: Jan. 21, 2009

(65) Prior Publication Data

US 2009/0195161 A1    Aug. 6, 2009

Related U.S. Application Data

(63) Continuation of application No. 11/634,706, filed on Dec. 6, 2006, now Pat. No. 7,501,768, which is a continuation of application No. 10/952,013, filed on Sep. 28, 2004, now Pat. No. 7,256,556.

(51) Int. Cl.
  *H05B 37/02*    (2006.01)

(52) U.S. Cl. ............ 315/291; 315/86; 315/307

(58) Field of Classification Search .......... 315/86, 315/160, 171, 172, 174, 209 R, 224, 246, 315/247, 272, 274, 276, 291, 307, 308, DIG. 4
See application file for complete search history.

(56) References Cited

U.S. PATENT DOCUMENTS

| | | | |
|---|---|---|---|
| 3,833,817 A | 9/1974 | Patel | |
| 4,237,405 A * | 12/1980 | Kellis | 315/307 |
| 4,323,820 A | 4/1982 | Teich | |
| 4,414,493 A * | 11/1983 | Henrich | 315/308 |
| 4,894,587 A | 1/1990 | Jungreis et al. | |
| 4,894,601 A | 1/1990 | Watkins | |
| 4,946,096 A | 8/1990 | Ballard et al. | |
| 5,646,502 A | 7/1997 | Johnson | |
| 5,734,230 A | 3/1998 | Edwards et al. | |
| 6,008,593 A * | 12/1999 | Ribarich | 315/307 |
| 6,107,985 A * | 8/2000 | Walukas et al. | 345/102 |
| 6,670,781 B2 | 12/2003 | Weindorf | |
| 6,784,624 B2 | 8/2004 | Buonocunto | |
| 6,856,103 B1 | 2/2005 | Hudson et al. | |
| 6,909,373 B2 | 6/2005 | Power et al. | |
| 7,256,556 B2 | 8/2007 | Lane et al. | |
| 7,259,527 B2 | 8/2007 | Foo | |
| 2003/0107332 A1 | 6/2003 | Newman, Jr. et al. | |
| 2003/0146714 A1 | 8/2003 | Buonocunto | |
| 2004/0183473 A1 | 9/2004 | Kamoi et al. | |

(Continued)

*Primary Examiner*—Douglas W Owens
*Assistant Examiner*—Tung X Le
(74) *Attorney, Agent, or Firm*—Kilpatrick Stockton LLP

(57) ABSTRACT

The present invention relates to systems, equipment and methods that provide emergency lighting and allow the detection of brownout conditions. One aspect of the present invention is an emergency lighting system with an input voltage interface for receiving an input voltage, a brownout detection component for detecting a brownout condition on the input voltage and generating a brownout signal, a switch mode power converter for altering the input voltage; and an emergency lighting control and battery charging component for controlling the charging of a battery pack and receiving the brownout signal. Another aspect of the invention is a method of providing emergency lighting performed by receiving an input voltage; automatically establishing a brownout threshold relative to the input voltage; and detecting a brownout condition.

12 Claims, 15 Drawing Sheets

U.S. PATENT DOCUMENTS

| | | |
|---|---|---|
| 2004/0257004 A1 | 12/2004 | Deurloo et al. |
| 2004/0263091 A1 | 12/2004 | Deurloo et al. |
| 2005/0184682 A1 | 8/2005 | Ribarich |
| 2005/0270812 A1 * | 12/2005 | Vinciarelli .................. 363/65 |
| 2007/0086128 A1 | 4/2007 | Lane et al. |

* cited by examiner

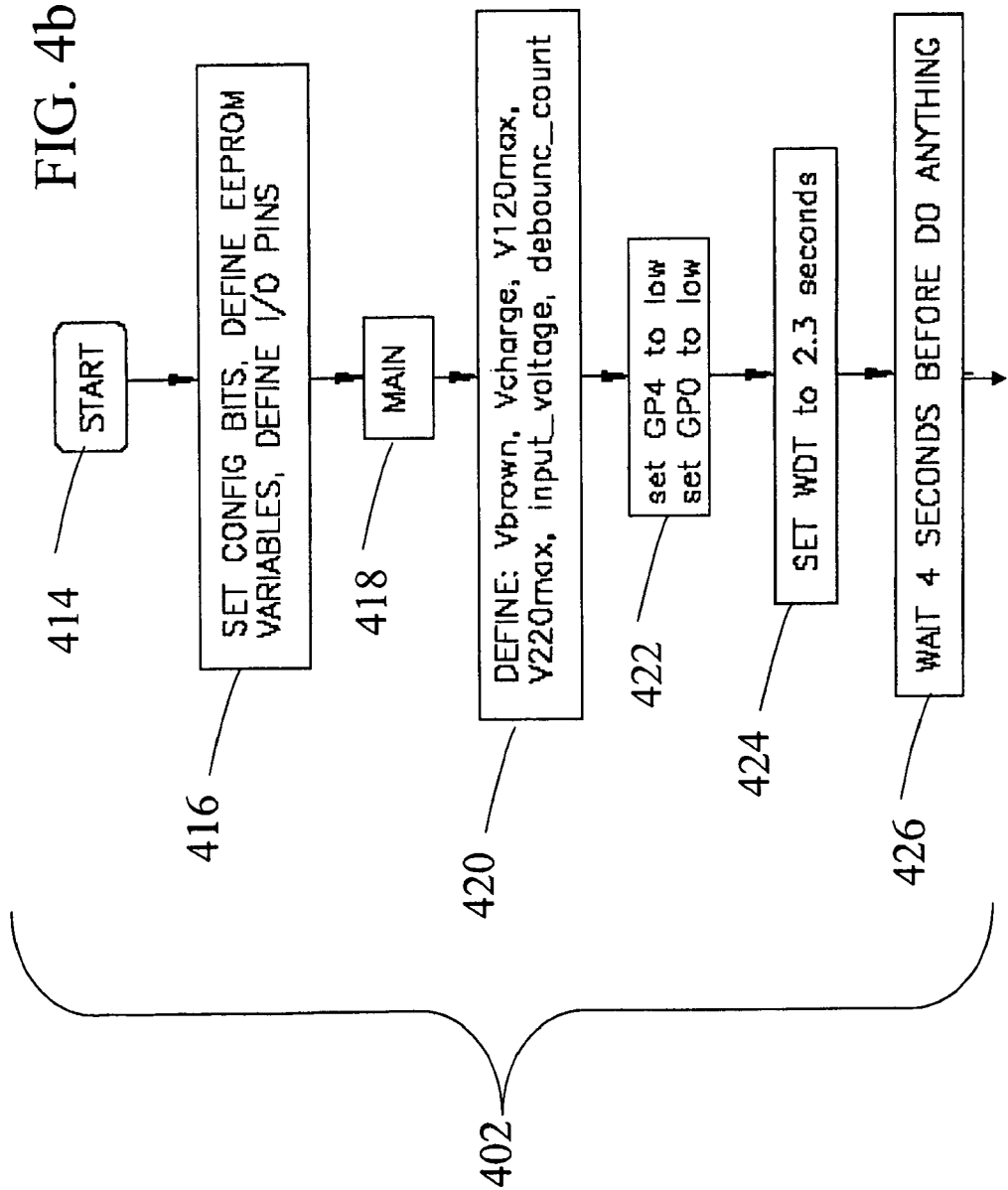

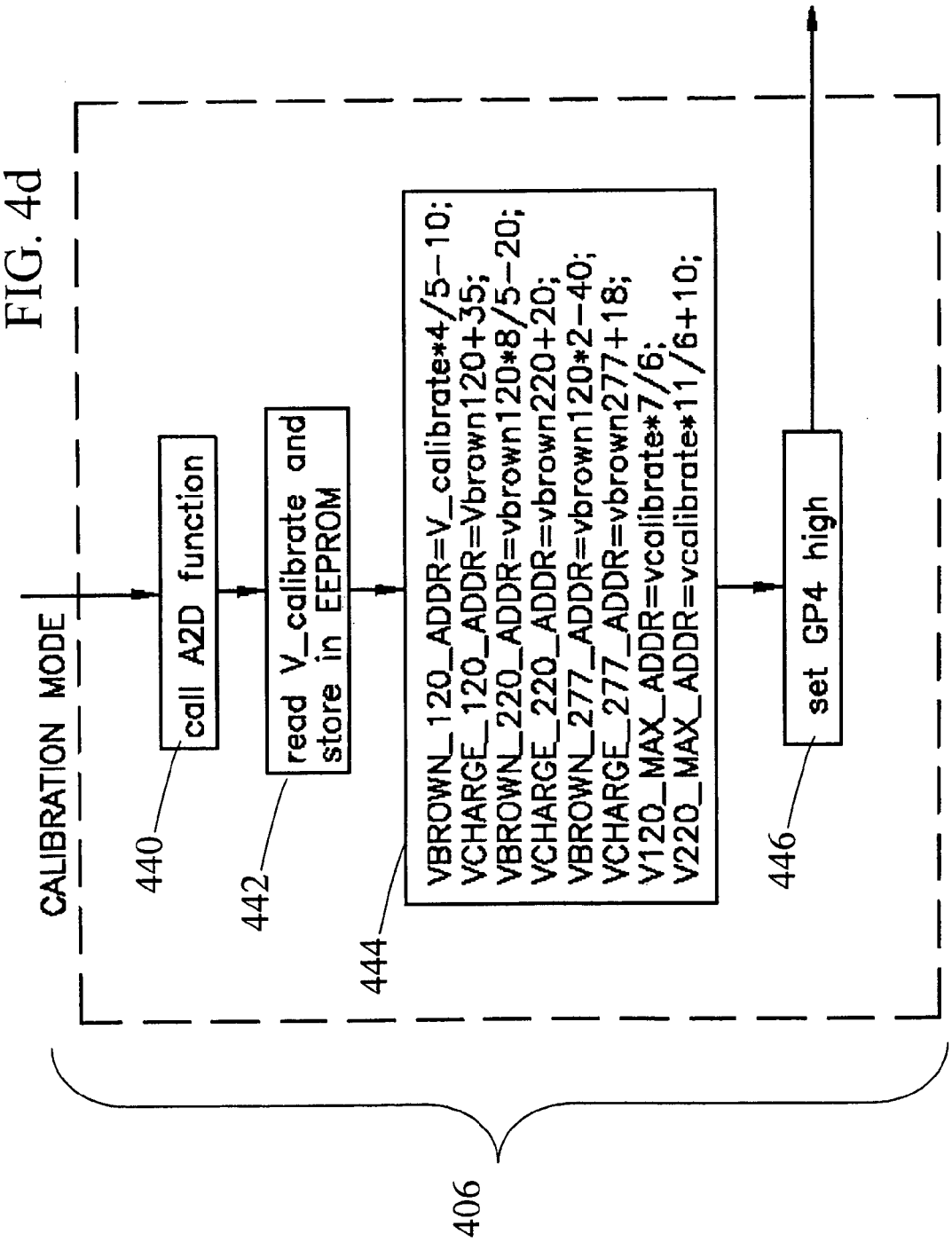

EQUIPMENT AND METHODS FOR EMERGENCY LIGHTING THAT PROVIDES BROWNOUT DETECTION AND PROTECTION

RELATED APPLICATIONS

This application is a continuation application of U.S. application Ser. No. 11/634,706, filed on Dec. 6, 2006, now issued U.S. Pat. No. 7,501,768, issued on Mar. 10, 2009, which is a continuation application of U.S. application Ser. No. 10/952,013, filed Sept. 28, 2004, now issued U.S. Pat. No. 7,256,556, issued on Aug. 14, 2007, the entire contents of which are incorporated by reference herein.

FIELD OF THE INVENTION

This invention relates to emergency lighting systems that provide brownout detection and protection. Specifically, the invention relates to emergency lighting units capable of detecting a brownout condition that occurs when there is a reduction of normal AC line voltage.

BACKGROUND OF THE INVENTION

Emergency lighting systems provide necessary light and protect against the dangerous conditions that may exist due to the lack of adequate lighting during a lighting emergency. Such a lighting emergency may occur when there is an interference with the normal electricity provided in a building or to the building's surroundings. In lighting emergencies it is often beneficial to illuminate specific areas, signs, exit signals, walkways, stairways, or to otherwise allow for the use of and exit from the premises by providing light or signals. Emergency lighting systems detect a lighting emergency and allow for automatic and adequate illumination when such an emergency occurs.

An emergency lighting system is one or more device, unit, apparatus, equipment or component used to detect the existence of a lighting emergency and/or provide emergency lighting or power for emergency lighting in a lighting emergency. An emergency lighting system may include one or more separately placed emergency detection and emergency lighting units.

Some emergency lighting systems detect the existence of an emergency condition by monitoring the electricity supplied to a building, or a portion of a building, and detecting when the electrical conditions are inadequate to provide for normal lighting. Note that the use of emergency lighting systems is not restricted to buildings. Emergency lighting is generally applicable anywhere that lighting or electricity is used. In that respect, the technology surrounding emergency lighting systems has far reaching applications, including potential uses in electronic devices, computers, automobile electronics, aircraft electronics, and many others.

Many emergency lighting systems are capable of detecting electrical conditions that are inadequate to provide for normal lighting. One such condition, known as a blackout, occurs a when a building, portion of a building, or other area loses power. Generally, such a condition occurs when the external power being supplied, is substantially or completely shut off, when there is a power outage, power failure, or other significant power disturbance. During a blackout, an emergency lighting system may detect and respond to the emergency condition by illuminating emergency lights and signs.

A brownout is another type of emergency lighting condition. A brownout occurs when there is a reduction of normal voltage in the electricity provided to a building, or portion of a building. For example, a brownout may occur on a summer day when the demand for electricity from a given power company is particularly high causing a drop in the voltage level provided by that power company. The voltage level may drop to the point where some or all of the normal lighting circuits cease to function.

Some emergency lighting systems utilize brownout detection circuitry to detect a reduction in the voltage that is supplied to the normal lighting system. The brownout detection circuitry is generally intended to recognize a situation when the voltage is too low for normal lighting circuits to provide illumination for a space. Note that some brownout detection circuitry may also detect a blackout since during a blackout there is little or no voltage or power. In many systems, once the brownout detection circuitry makes a determination that the voltage is too low, a battery powered lamp is turned on to provide lighting until the voltage rises to a point sufficient to resume providing illumination through the normal lighting system. The emergency lamps are usually direct current ("DC") powered lamps intended to efficiently provide an adequate level of illumination to ensure safety during the power emergency.

A building's normal electricity supply provides an input voltage that may be both monitored and used by an emergency lighting system. Emergency lighting systems use the input voltage, usually after converting the voltage to direct current, to provide power to charge or recharge a battery. The systems also monitor the input voltage for emergency lighting condition such as a blackout or a brownout. Accordingly, many emergency lighting systems include (1) powering circuitry to use the input voltage to power the charger and (2) detection circuitry to monitor the input voltage for the existence of an emergency condition.

Prior art methods of powering the charger and detection circuitry in emergency lighting systems typically have involved either a transformer or capacitive input circuit. These components were used to change the voltage level or otherwise alter the electricity provided by the input voltage to an appropriate type useful to the battery charger or detection circuitry.

A transformer is an energy coupling device that takes electrical energy at one voltage and transforms it to another voltage. The new voltage may be higher (stepped up) or lower (stepped down), or it may remain the same as the input voltage. For example, if an input voltage of 480V, the rated voltage, is applied to the primary of a 480V-120V single winding transformer, the secondary voltage produced by the transformer will be 120V. In use, however, the input voltages are often higher or lower than the rated voltage of a transformer's primary. In these instances the secondary voltage will be higher or lower respectively. For example, a 480-120V single winding transformer with an input line voltage of 456V will have a secondary output voltage of 114V. This is because the transformers voltage ratio is 4:1 (480V primary divided by 120V secondary). Thus, its secondary voltage is 456V divided by 4, or 114V. Conversely, this same transformer with an input voltage of 504V will have a secondary voltage of 126V (504V divided by 4).

Transformers often have one or more voltage taps. A voltage tap is an additional connection on either the primary or secondary side of the transformer. A voltage tap allows the user of the transformer to alter the transformer's voltage ratio. As described above, the voltage ratio determines the voltage transformation that takes place. There are times when the actual incoming voltage is different than the expected normal incoming voltage. When this happens, it may be advantageous to be able to change the voltage ratio in order to get the desired (rated) output voltage. Voltage taps, designed into the transformer's primary, deliver this desired flexibility. In other words, tapping the primary in a number of different spots provides a means to adjust the turns ratio and fine-tune the secondary output voltage. These tap connections are usually set at the factory for normal line voltages. During installation, the appropriate tap may be selected depending on the input voltage present at the installation site.

In emergency lighting systems, transformers have been used to step down an input voltage to a lower voltage, which is then used to power the charger circuitry. Because the transformer could have multiple input voltage taps, the transformer could accept input voltages of various magnitudes allowing the emergency lighting system to be used in different voltage environments. For example, one common method has been to utilize a 60 Hz line rated transformer with taps for 120 and 277 VAC. During installation the electrician could select the appropriate tap for the voltage level at the site.

Capacitive divider circuits are also used to step down an input voltage to power the charger circuitry in emergency lighting systems. Like transformers, capacitive divider circuits can also have taps, which allow the use of emergency lighting systems using these circuits in different voltage environments. For example, a capacitive divider circuit with taps for 120 and 277 VAC could be used in an emergency lighting system.

The use of a transformer or capacitive divider circuit in past emergency lighting systems allowed for relatively simple brownout detection circuitry in those systems. There were two main categories of brownout detection circuits used in these systems. Some brownout circuits utilized a set input voltage tap on the primary side of the transformer or capacitive divider while other brownout detection circuits used the secondary voltage produced on the secondary side of the transformer or capacitive divider.

In the first category of brownout detection circuits mentioned above, the circuit took advantage of the availability of a set voltage tap, usually 120V, present on in the emergency lighting system. The above methods of powering the charger circuitry with a transformer of capacitive divider circuit insured that no matter what voltage was applied to the system in the field, a set voltage tap, usually 120V, of the transformer or capacitive divider always had a set voltage present that varied proportionally with the input voltage. Because this was the case, a simple circuit could be used to generate a DC voltage that was the same regardless of the input tap selected and in proportion to the incoming AC input voltage regardless of the input voltage level. The ability to generate a single DC voltage proportional to the input voltage level regardless of the input voltage level meant that a simple comparator circuit could be used to detect a brownout condition by detecting drops in the input voltage.

In the second category of brownout detection circuits mentioned above, the circuit utilized the secondary voltage produced on the secondary side of the transformer or capacitive divider. These circuits use a reduction in the voltage on the secondary side of the transformer or capacitive divider to infer a reduction in the input voltage on the primary side.

Although detecting brownout conditions on the secondary side works reasonably well, this method has significant disadvantages. Specifically, the loading of the charger circuitry by a discharged battery can be mistaken for a reduction in the input voltage. Because of this disadvantage, circuits that employ this method for detecting a brownout condition normally have the point where the brownout circuit turns on the emergency circuit, the brownout threshold, preset at a significantly lower percentage of normal input voltage (eg. 65-70%) to avoid false triggers of the brownout circuit under conditions of heavy transformer loading. In other types of brownout circuits the brownout threshold would typically be preset at around 80% of the nominal input voltage. Because the brownout threshold is set lower for brownout detection circuits that use the secondary side, these circuits increase the likelihood that input conditions may exist where the normal lighting circuits have failed but the emergency lighting has not started to provide illumination.

As switch mode power converter technology has been improved significantly over the past several years, it has now become economically feasible to replace the common transformers or capacitive divider circuits used extensively in the past in emergency lighting systems with a switch mode power converter. A switch mode power converter is an example of a wide input supply range converter. This type of circuitry offers the advantage of being able to operate over a wide input supply range (85-305 VAC 50-60 Hz) that eliminates the voltage specific taps needed with transformer or capacitive input circuits. The flexibility of this type of input circuitry offers many advantages over using transformers or capacitive dividers with either type of brownout detection described above. First, a switch mode power converter provides greater input range flexibility. Odd voltage and frequency (eg. 220V 50 Hz) AC input requirements can be met without having to specify different transformer types or capacitor values. Second, there is a reduction in the likelihood of field wiring mistakes that can occur when an electrician selects the wrong tap to power the system. Third, using a switch mode power converter instead of a transformer or capacitive divider circuit may allow the size of the emergency lighting system to be reduced.

The conventional methods of brownout detection cannot be used when a switch mode power converter is used in place of a transformer or capacitive divider circuitry. This is the case because using the switch mode power converter circuitry eliminates key elements normally relied upon to implement a simple, low cost, brownout detection circuit.

A first problem is that the set voltage tap is not available because of the wide input voltage range topology inherent in the switch mode power converter. Without this tap there is no common reference point that can be used to generate the single voltage level that is proportional to the input voltage regardless of the value of that input voltage. Accordingly, brownout detection circuits that rely on this set voltage tap cannot be used with a switch mode power converter.

Another problem is that the change in the secondary output voltage over the wide range of input voltages is tightly regulated and therefore not useful to brownout detection circuits. This means that brownout detection topologies that rely on secondary side outputs can no longer be used to determine the change in the input voltage on the primary side of the circuit in systems that utilize a switch mode power converter.

Another complication in implementing common brownout detection techniques with switch mode power converter technology results from the frequent requirement in emergency lighting equipment to isolate the primary and secondary sides of the circuit. Specifically, the brownout detection circuitry located on the primary side of the circuit must communicate or send its output to the circuitry that controls the lamps or lighting on the isolated secondary side of the circuit.

SUMMARY OF THE INVENTION

The present invention comprises methods and systems for an emergency lighting unit that provides brownout detection and protection. One aspect of the present concept utilizes a switch mode power converter to produce the low voltage DC for battery charging and control functions provided by emergency lighting systems. Another aspect of the present invention provides a brownout detection circuit capable of automatically adapting to a wide range of different input voltages. Another aspect of the present invention provides brownout circuitry that automatically determines brownout threshold values based on the normal input voltage connected to the system. These exemplary embodiments are mentioned not to limit or define the invention, but to provide an example of embodiments of the invention to aid understanding thereof.

A first embodiment of the present invention is an emergency lighting unit with an input voltage interface for receiving an input voltage, a brownout detection component for detecting a brownout condition on the input voltage and generating a brownout signal, a switch mode power converter for altering the input voltage, and an emergency lighting control and battery charging component for controlling the charging of a battery pack and receiving the brownout signal.

A second embodiment of the present invention provides a method of providing emergency lighting by receiving an input voltage, automatically establishing a brownout threshold for the input voltage; and detecting a brownout condition. This method may be capable of automatically adapting to a wide range of different input voltages. Specifically, one embodiment is capable of maintaining brownout thresholds for multiple nominal input voltages proportional to those same voltages. This embodiment includes a brownout detection circuit that receives input voltages and establishes brownout thresholds for those input voltages. For example, the system could be set to establish a brownout threshold of 80% of the normal input voltage value. Accordingly, if the normal input voltage is 120VAC, then the embodiment will set a brownout threshold of 96 VAC (80% of 120) and if the normal input voltage is 277 VAC, then the system will set a brownout threshold at 221.6 VAC (80% of 277). In this exemplary embodiment, the brownout threshold is 80% of the nominal input voltage. The invention contemplates setting at the brownout threshold at other proportional values, i.e. 75% or 83%. This disclosure does not intent to in any way limit the value or proportion of the voltage threshold. Various thresholds will be appropriate for different circumstances and different embodiments of this invention. There may be some cases were the brownout threshold would be set extremely low (for example at 1% of the nominal input voltage) and other circumstances where it would be set high extremely high (for example at 99% of the nominal input voltage.) The invention also contemplates setting brownout thresholds that vary based on nominal input voltage levels using a rule other than the proportional rule mentioned above.

In this embodiment, after the system sets the brownout threshold, the system monitors the input voltage for a brownout condition. A brownout condition occurs when the input voltage drops below the brownout threshold. In this manner the system can detect a brownout condition. In this example, the brownout threshold is set at 80% of the nominal input line value. If a brownout condition is detected, the system generates a brownout signal that is communicated in some manner to the equipment or circuitry that controls the emergency light source. The method of communicating this signal will vary depending on the requirements of the emergency lighting system. Although various methods of communicating this signal are discussed herein, the invention is not limited to any particular method.

A third embodiment of the present invention provides a brownout protection system with an establish brownout threshold component for automatically determining a brownout threshold for an input voltage, a monitor input voltage component for detecting a brownout condition when the input voltage drops below the brownout threshold, and a signal emergency lighting component to signal emergency lighting when a brownout condition is detected.

A fourth embodiment of the present invention provides a method of providing emergency lighting by receiving an input voltage, monitoring the input voltage for a brownout condition, if a brownout condition exists, sending a brownout signal to activate emergency lighting; but if a brownout condition does not exist, using a switch mode power converter to provide power.

BRIEF DESCRIPTION OF THE DRAWINGS

FIGS. 4a-g illustrate a logic flow for performing brownout detection functions in accordance with one embodiments of the present invention.

DETAILED DESCRIPTION OF SPECIFIC EMBODIMENTS

Figure 1:
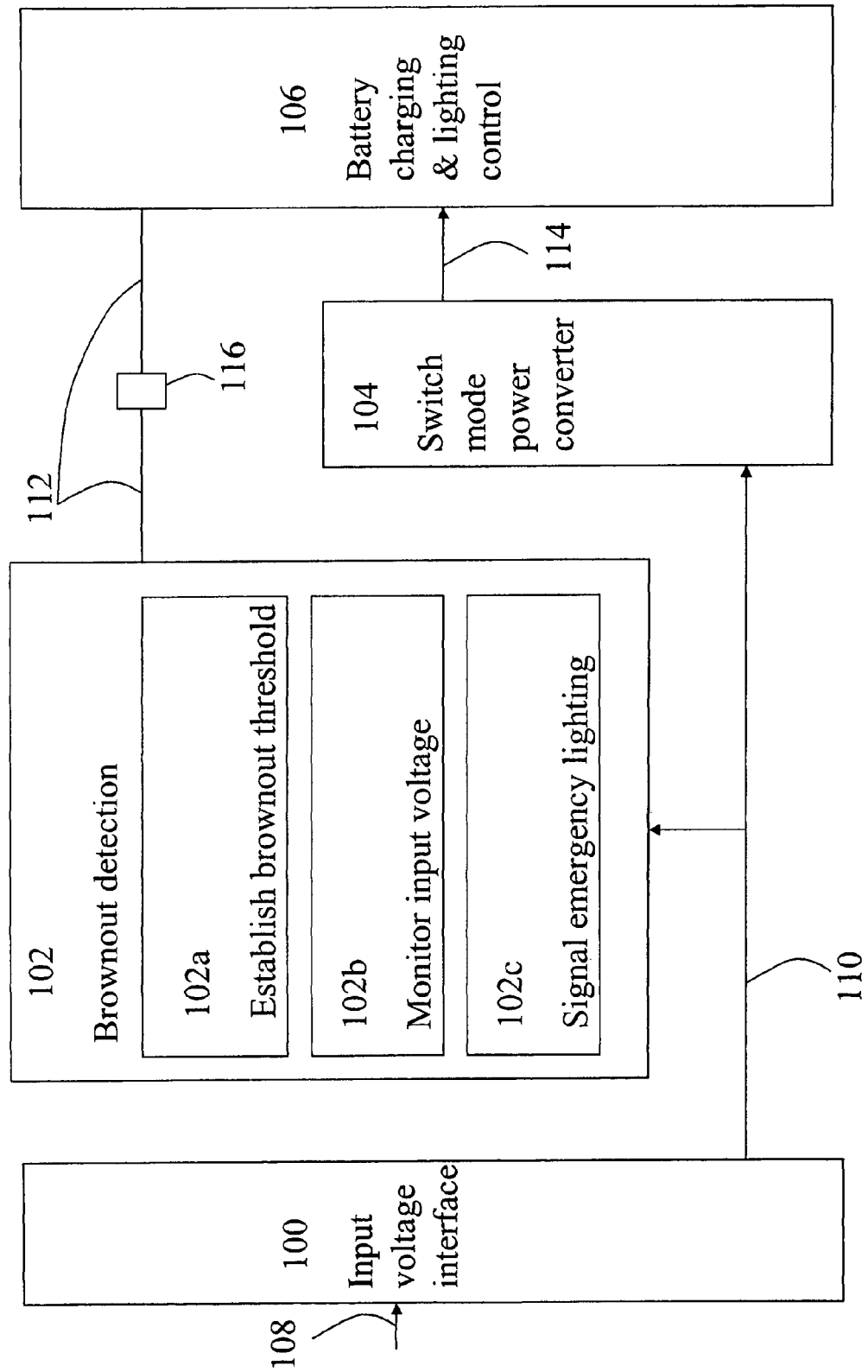
FIG. 1 illustrates a block diagram of a system in accordance with one embodiment of the present invention.

Referring now to the drawings in which like numerals indicate like elements throughout the several figures.

FIG. 1 illustrates a block diagram of a system in accordance with one embodiment of the present invention. This figure shows a system divided into four major sections differentiated by fundamental functional differences. As shown in the diagram, the input voltage interface 100 receives an input voltage 108. Input voltage 108 is typically from the building line voltage and in the range from 102 VAC to 305 VAC. The input voltage receiver 100 may also perform various rectifying, smoothing or other functions on the input voltage 108 ensuring that government standards for electrical equipment are satisfied. Once the input voltage 108 has been rectified and smoothed by the input voltage interface 100, the rectified input voltage 110 is provided for use in the brownout detection 102 and switch mode power converter 104 functions.

In FIG. 1, brownout detection is performed by monitoring the voltage level of the rectified input voltage 110. When the voltage level of the rectified input voltage 110 is measured below a certain value, or brownout threshold, a brownout condition is signaled. The brownout threshold may be hard-coded into the circuit, determined based on the input voltage, or otherwise automatically determined based on some other criteria. During brownout detection, the system monitors the rectified input voltage 110 by repeatedly sampling the input voltage 110 and comparing the voltage level with the brownout threshold. As long, as the rectified input voltage remains above the brownout threshold, the system does not need to signal a brownout. If the rectified input voltage 110 drops below the preset brownout threshold a drive signal 112 is outputted signaling for emergency lighting. The drive signal 112 may be sent to a component or unit that is electrically isolated from the component performing brownout detection 102. For example, this isolation function 116 could be accomplished using an optocoupler.

The brownout detection may occur by automatically detecting a brownout threshold. In this embodiment, brownout detection 102 is performed by automatically establishing a brownout threshold 102a, monitoring the rectified input voltage 102b, and signaling for emergency lighting 102c when a brownout lighting emergency occurs. The circuit performing these functions determines a brownout threshold using the rectified input voltage 110. For example, the brownout threshold may be set to 80% of the nominal value of the rectified input voltage 110. After the brownout threshold is established, the system monitors the rectified input voltage 110. As before, if the rectified input voltage 110 drops below the preset brownout threshold a drive signal 112 is outputted signaling for emergency lighting.

In FIG. 1, the switch mode power converter 104 function converts the rectified input voltage 110 into a charging voltage 114. The widely used new family of universal input switch mode power supplies based on the Tiny Switch-II off-line Switcher could perform such a function. The basic function of this circuitry is to provide a constant output voltage. Even though, the input voltage 108 and rectified input voltage 110 may vary over a wide voltage range depending on the environment in which the system is installed, the switch mode power converter function provides a set voltage electricity for charging the battery. One example of the typical output voltage of the switch mode power converter 104 is 19.2 V. This electrical signal is filtered and supplied to the charger circuitry of the batter charging and lighting control 106 component.

The main purposes of the battery charging and lighting control 106 component are to control the charging of the battery pack connected to the unit and to enable the DC lamps when the brownout detection circuitry detects the input voltage levels are below the brownout threshold.

Figure 2:
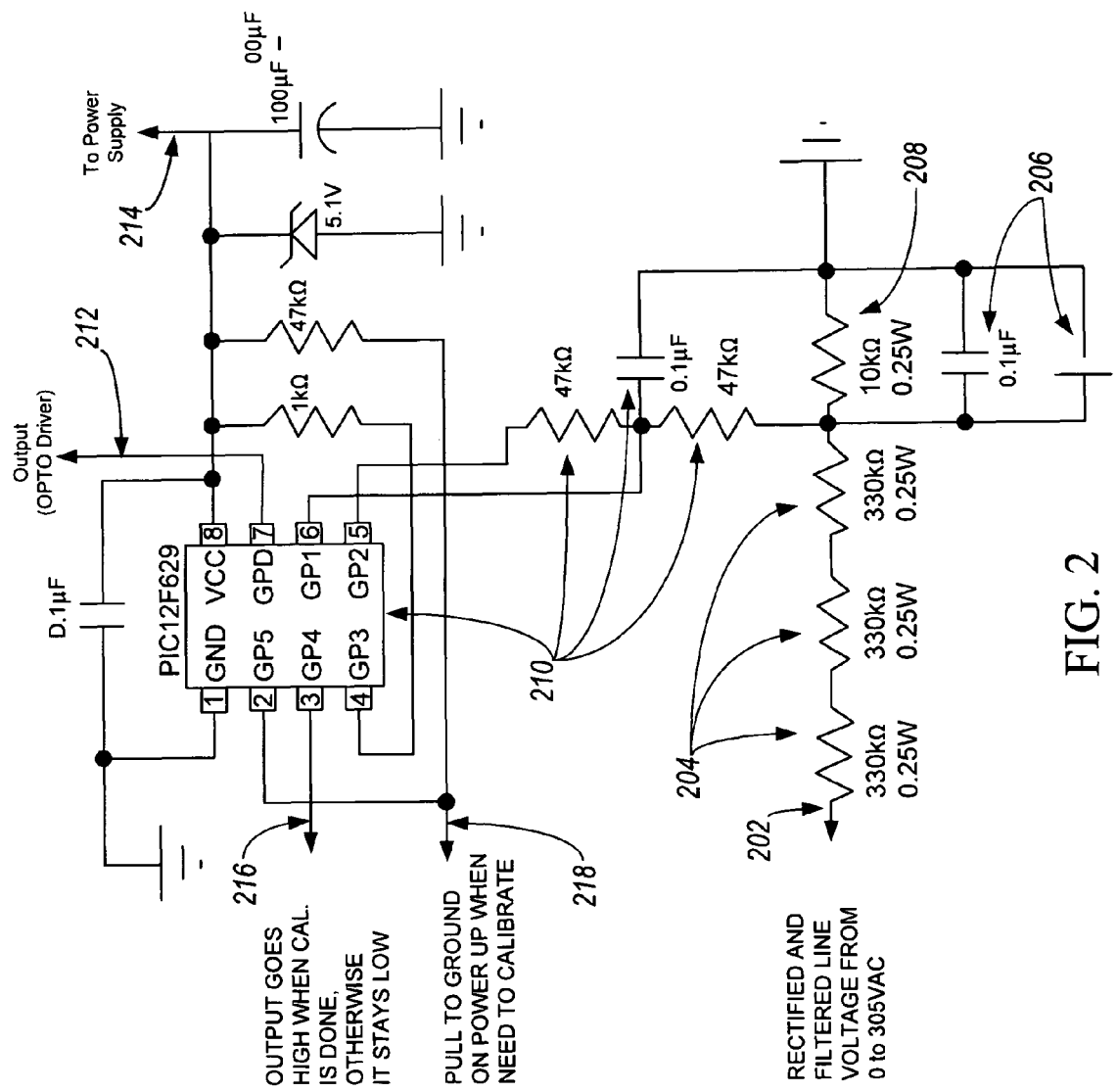
FIG. 2 illustrates a circuit diagram of a brownout detection component in accordance with one embodiment of the present invention.

FIG. 2 shows a circuit diagram of one embodiment showing circuitry used to perform brownout detection function 102. In FIG. 2, a rectified and filtered input voltage 202 is provided to a first voltage divider element 204. In one embodiment, the voltage divider consists of 3 resistors, shown as first voltage divider element 204, and one resistor, shown as second voltage divider element 208. The resistor network formed by the first voltage divider element 204 and the second voltage divider element 208 is sized so that the maximum voltage across second voltage divider element 208 is below the maximum input limit of the brownout controller.

The filter and bypass capacitors 206 are used to ensure that a pure DC level and transient free sense signal is supplied directly to the input of brownout controller 210 which performs the analog to digital conversion. In one embodiment, the filter and bypass capacitors 206 consist of an electrolytic capacitor and a ceramic capacitor.

In the brownout controller 210, the analog to digital conversion is carried out using a microcontroller with an internal comparator function, internal voltage reference and timers, and an external discrete integrator. This technique is usually known as the Delta-Sigma converter. The benefits of this conversion technique include its high resolution and fast conversion speed. Other conversion options may include, but are not limited to, various A/D converters with post-processing logic devices to determine the appropriate action based on the sampled A/D value.

However, one embodiment uses a cost-effective microcontroller with an internal EEPROM and comparator with multiple I/O pins.

The brownout controller 210 may be electrically connected to other emergency lighting components in a multitude of ways. In the embodiment shown, the brownout controller 210 connects to a power supply via line to power supply 214. The circuit calibration is initiated manually by pulling the GP5 input pin 218 to ground during the unit's power up. The microcontroller performs an auto-calibration provided that the input reference voltage is stable and at the level that the microcontroller is designed to perform the calibration. One embodiment uses 120VAC for the reference input line voltage. The calibration output 216 of the brownout controller is used to signal when calibration is done. Calibration is done after the brownout circuit has determined appropriate brownout threshold levels for each nominal line voltage that the circuit is intended to operate. The calibration output goes to high whenever calibration is done, otherwise it stays low.

A significant advantage of the circuit configuration depicted in FIG. 2 is its ability to recognize three different input voltages (120, 220-24 and 277 VAC) and associate the appropriate brownout threshold specific for the input voltage present. This circuit configuration is independent of the line frequency, so it may be used with 50 or 60 Hz systems.

The brownout controller 210 of the present embodiment utilizes an auto-calibration technique to compensate for the discrete components tolerances. When the calibration mode is initiated, the brownout controller 210 samples the input reference line voltage and based on that value calculates and stores appropriate brownout thresholds for each nominal line voltage. This is possible because the analog to digital conversion is linear. In one embodiment, the brownout threshold is set to 80% of the reference input voltage sampled. Accordingly, with this technique the brownout threshold remains proportional at 80% with any nominal input voltage, in the designated range.

It is important to sense an accurate input voltage to efficiently set the brownout threshold. For example, if the preset brownout threshold is set to low, stray voltages on the neutral line could confuse the brownout controller 210 and cause emergency lighting to remain off even when a brownout condition has occurred. Conversely, if the brownout threshold is set too high, the brownout controller 210 may send a driver output turning the lamps on and causing the battery to discharge.

The present invention provides an accurate and reliable way of detecting a brownout state for different input voltage values. One embodiment of the present invention is designed for reliable operation from 85VAC to 305VAC and to recognize three input voltages (120, 220-240 and 277 VAC). However, the invention could easily be implemented for a different input voltage range or for different input voltage values. For example, one method of altering this embodiment to allow for higher AC line voltages could be accomplished with the appropriate modification of the first voltage divider element 204 and the second voltage divider element 208 and by using a higher resolution analog to digital converter.

Figure 3:
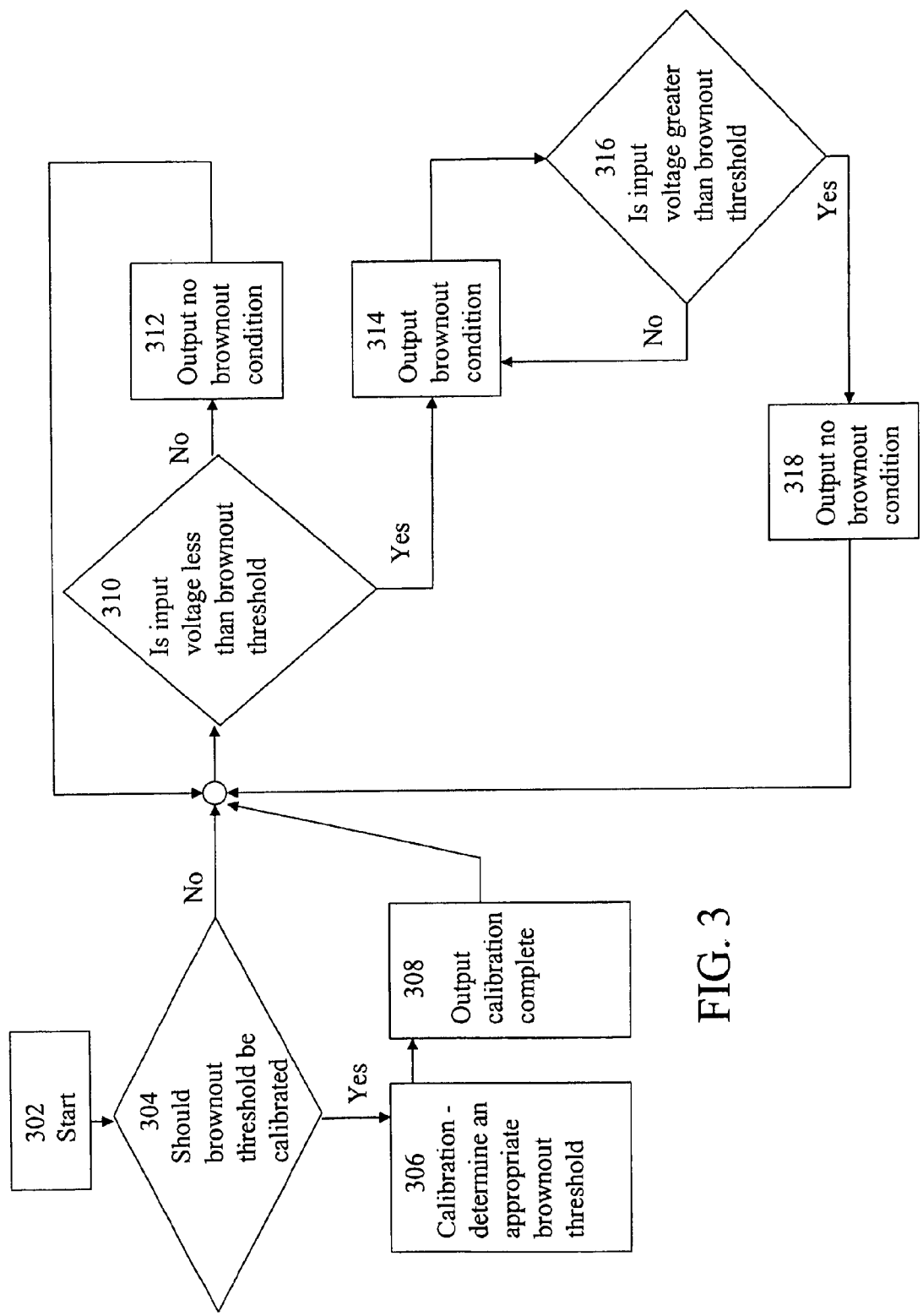
FIG. 3 illustrates a logic flow for performing brownout detection functions in accordance with one embodiments of the present invention.

FIG. 3 is flow chart illustrating an example of the logic that may be performed using the microcontroller of the brownout controller 210. The invention contemplates using this or similar logic to determine a brownout threshold value and monitor for a brownout condition.

The processes begin at the start 302 block. Next, the brownout controller 210 determines whether conditions are appropriate to set a brownout threshold 304. If the conditions are not appropriate, then the controller proceeds to block 310. However, if the conditions are appropriate, then prior to proceeding to block 310, the brownout controller 210 determines an appropriate brownout threshold and outputs a signal indicating that calibration is complete as shown in blocks 306 and 308.

In block 310, the brownout controller determines if the input voltage is less than the set brownout threshold. If the input voltage is not less than the brownout threshold, then the brownout controller outputs a no brownout condition indication 312 and returns to block 310 to once again determine whether the input voltage is less than the brownout threshold. By looping in this manner, the input voltage is continually monitored for the existence of a brownout condition.

If the input voltage is ever determined to be less than the brownout threshold in block 310, then the brownout controller outputs a brownout condition indication 314 and proceeds to block 316. In block 316, the brownout controller determines whether the input voltage is greater than the brownout threshold. If not, the brownout controller 310 returns to block 314 again outputting a brownout condition indicator. By looping in this manner, after a brownout has occurred, this embodiment continues to monitor the input voltage.

If during a brownout, the brownout controller determines that the input voltage is greater than the brownout threshold in block 316, then the brownout controller outputs a no brownout condition indicator 318 and returns to block 310 to continue monitoring the restored input voltage.

Figure 4A:
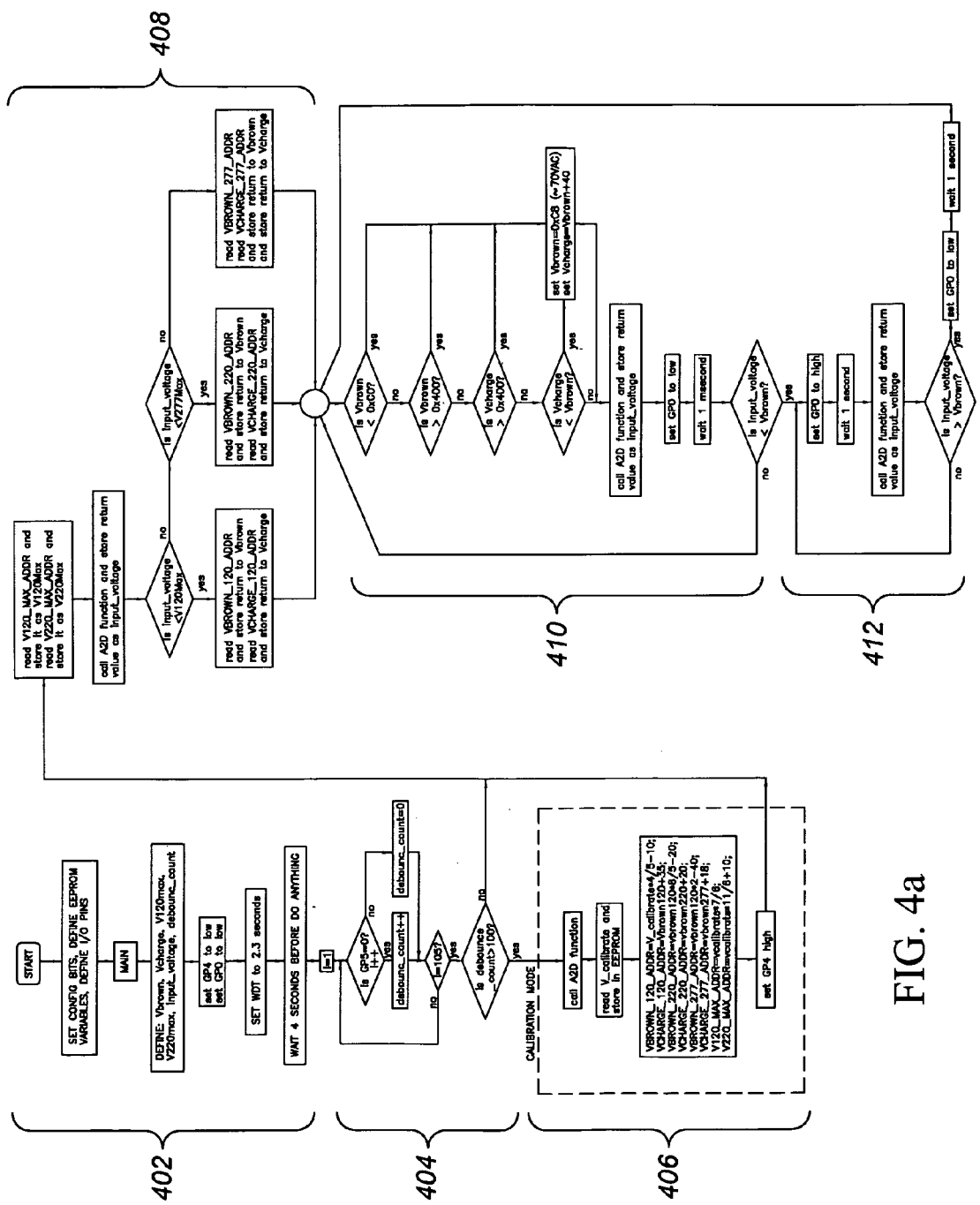

FIG. 4a is a flow chart illustrating another example of the logic that may be performed using the microcontroller of the brownout controller 210. Note that FIG. 4a represents only one of many possible ways to implement the present invention that would be available to one of ordinary skill in the art.

FIGS. 4b-4g each illustrate a specific portion of the flow chart of FIG. 4a as described below. The exemplary logical flow shown in FIG. 4a recognizes three nominal input voltages (120, 220-240, and 277VAC). Other embodiments of this invention include logic that recognizes other nominal input voltage values. For example, another embodiment of the invention could include logic to determine thresholds for five different nominal input voltages including voltage levels below and above the three listed above.

For purposes of illustration, the flow chart of FIG. 4a is broken down into several logical areas. The initialization section 402 initializes variables and outputs. The brownout threshold decision section 404 determines whether brownout threshold calibration is required. The brownout calibration 406 section determines the appropriate brownout threshold value for each nominal input voltage. The input voltage read and compare section 408 reads the input voltage and sets variable values depending on value of the input voltage. The monitor during non-brownout out section 410 monitors the input voltage during non-brownout conditions. Finally, the monitor during brownout section 412 monitors the input voltage during a brownout condition.

FIG. 4b illustrates the initialization section 402 of FIG. 4a, which initializes variables and outputs. The process begins with start element 414. The SET CONFIG BITS, DEFINE EEPROM VARIABLES, DEFINE I/O PINS 416 block sets the configuration bits, defines variables for the electronically erasable programmable read only memory ("the EEPROM"), and defines the input output pins. The MAIN 418 block indicates the start of the main logic. The DEFINE: VBROWN, VCHARGE, V120MAX, V220MAX, INPUT_VOLTAGE, DEBOUNC_COUNT 420 step defines variables.

The SET GP4 TO LOW, SET GP0 TO LOW 422 block sets two outputs of the microprocessor to low. The GP4 output indicates when calibration of the brownout threshold is done. When GP4 is high, calibration is done, otherwise it stay low. In this step, GP4 is set low. GP0 is the output indicating when the lighting equipment should be turned on. GP0 may correspond to the driver signal 112 described above. When GP0 is high, the system is signaling for the emergency lighting to be illuminated, when GP0 is low, the system is signaling for the emergency lighting to be turned off. The SET WDT TO 2.3 SECONDS 424 block sets the watch dog timer to 2.3 seconds. This timer reset variable may vary significantly in other embodiments depending on the intended application and function of the system. The WAIT 4 SECONDS BEFORE DO ANYTHING 426 tells the system to wait for 4 seconds allowing the filtered DC signal to stabilize. This wait can also vary in length.

Figure 4C:
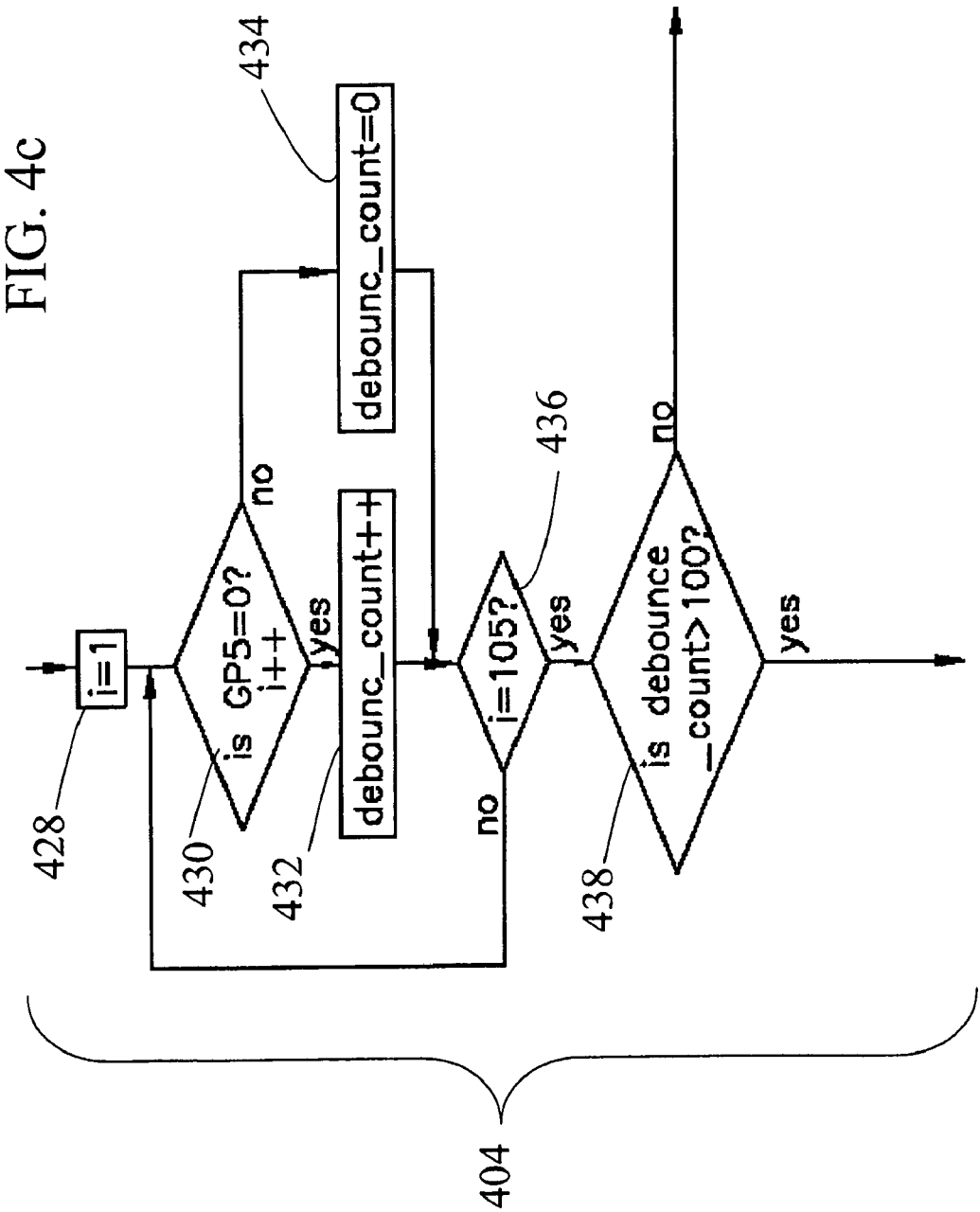

FIG. 4c illustrates the calibration decision section 404 of FIG. 4a, which determines whether brownout thresholds calibration is required. The calibration decision section 404 follows the initialization section 402.

Steps 428, 430, 432, 434 and 436 repeatedly check the ground to ensure that the calibration mode is desired. This technique prevents any unintentional calibration in the field usage. Any unintentional calibration could cause false brownout thresholds and therefore could cause a severe impairment of the emergency lighting unit.

Returning to the embodiment shown, in the i=1 428 block, the variable "i" is set to a value of 1. In the IS GP5=0? i++ 430 decision block, the value of input pin GP5 is checked to see if it is equal to 0. The variable "i" is also incremented in this step. The GP5 is a pull to ground by user if the calibration mode is desirable. If GP5 is pulled to ground then the variable "debounc_count" is incremented in block 432. If GP5 is not equal to 0 then the variable "debounc_count" is set to zero in block 434. In block 436, the microprocessor checks to see if the variable "i" is equal to 105. If it is not, then the processing returns to block 430 and GP5 is checked again. In this manner the "i" variable is used to create a loop that will repeat 104 times, because the variable "i" is increased on every successive loop through step 430 until "i"=105. In this manner, GP5 is monitored over a short period. Each time GP5 is checked, the variable debounc_count, which starts at 0, is either increased or reset to zero. Once the value of "i"=105, the processing continues to decision block 438.

In the IS DEBOUNC_COUNT>100 438 block, the variable is_debounc_count is compared with 100. If the variable is greater than 100 then the processing proceeds to the calibration mode 406 processing. If it is 100 or less the processing skips the calibration mode 406 processing steps and proceeds directly to the input voltage read and compare section 408. The purpose of requiring over 100 successful pulls to ground in succession is to ensure that the calibration mode is desired. The above procedure is intended to reduce the chance of the microcontroller going into a calibration mode in the field usage.

FIG. 4d illustrates the brownout calibration 406 section if FIG. 4a, which determines the appropriate brownout threshold values for the input voltages. In the CALL A2D FUNCTION 440 block the A2D function is called. The input voltage is measured through the microcontroller's internal analog to digital converter and the value is stored as v_calibrate. In the READ V_CALIBRATE AND STORE IN EEPROM 442 block the value of the v_calibrate variable is stored in EEPROM. In block 444, the v_calibrate is used to calculate the brownout threshold for each nominal line voltage intended for this embodiment. In the SET GP4 HIGH 446 block the output GP4 is set to high. As described above GP4 is high when calibration is complete. After calibration is complete, processing continues to block 408.

Figure 4E:
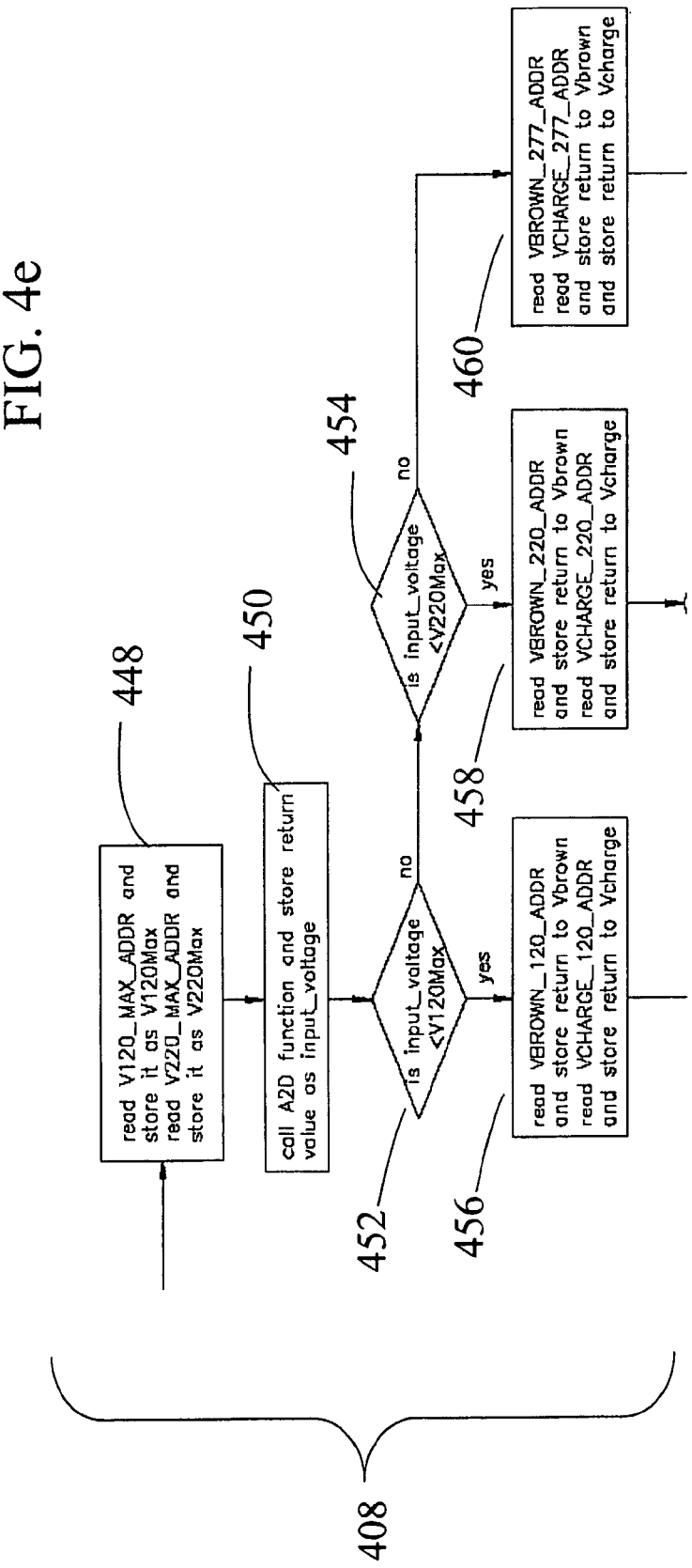

FIG. 4e illustrates the input voltage read and compare section 408 of FIG. 4a which reads the input voltage and sets threshold variable values depending on value of the input voltage. In block 448, V120_MAX_ADDR is read and stored as V120Max and V220_MAX_ADDR is read and stored as V220Max. In block 450, function A2D is called and the result is stored as input voltage. Blocks 452 and 454 determine which values to store as vbrown and vcharge. If the input voltage is less than V120Max then in block 456 Vbrown is set to the value in VBROWN_120_ADDR and Vcharge is set to VCHARGE_120_ADDR. If the input voltage is not less than V120Max but less than V220Max then in block 458 Vbrown is set to the value in VBROWN_220_ADDR and Vcharge is set to VCHARGE_220_ADDR. Finally, if the input voltage is not less than V120Max and is not less than V220Max, then in block 460 Vbrown is set to the value in VBROWN_277_ADDR and Vcharge is set to VCHARGE_277_ADDR. Once these variables are set processing continues to section 410.

Figure 4F:
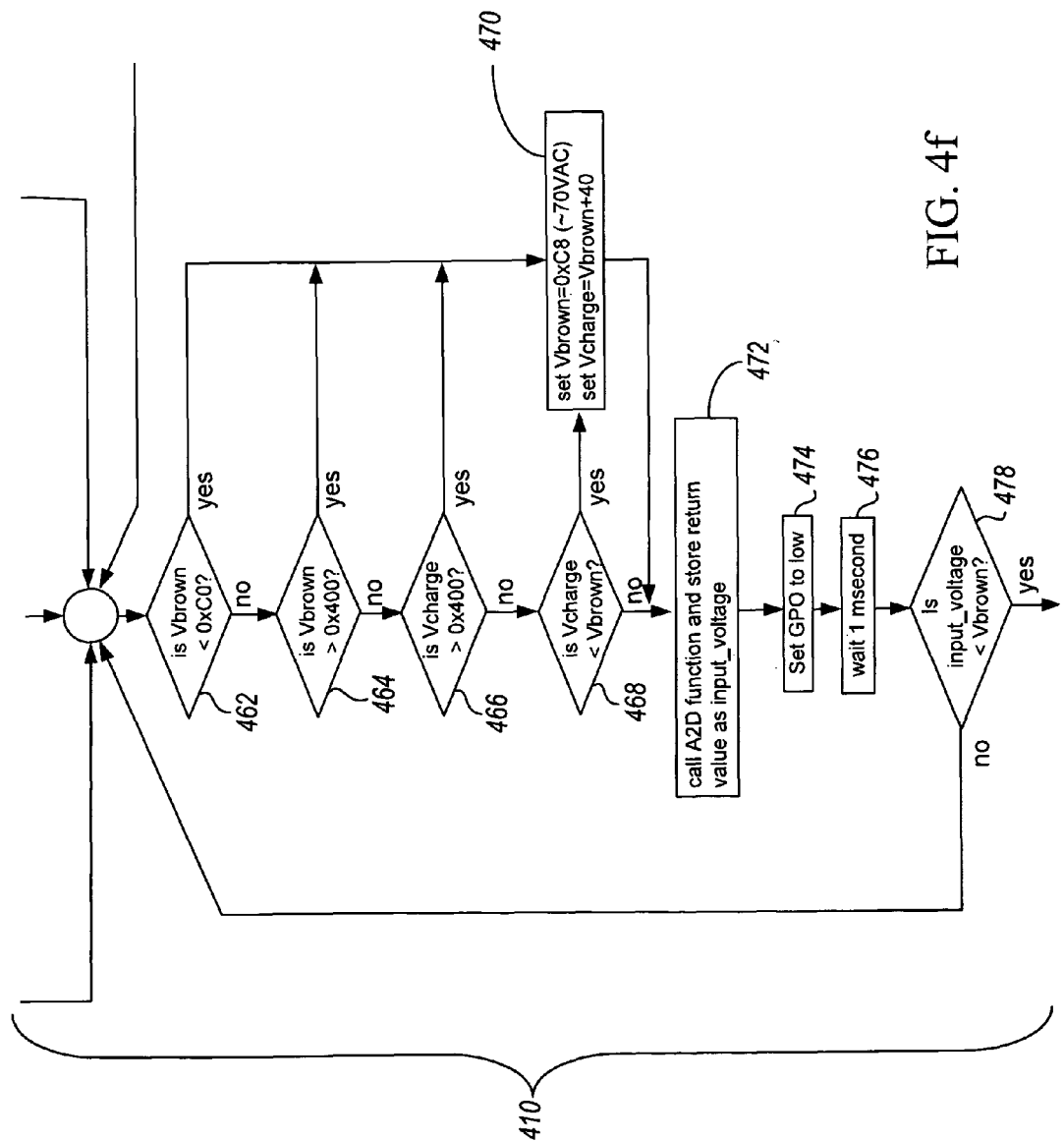

FIG. 4f illustrates the monitor during non-brownout out section 410 of FIG. 4a which monitors the input voltage during non-brownout conditions. Blocks 462, 464, 466, and 468 perform integrity checks on the values of Vbrown and Vcharge. If either the Vbrown or Vcharge contain the values that are below or above the valid range, then the Vbrown and Vcharge are set to default values. In block 472, function A2D is called and the return value is stored as input_voltage. In the SET GP0 TO LOW 474 block, GP0 is set to low. As described above, when GP0 is low the system is signaling for the emergency lighting to be turned off. In block 476, the system performs a brief wait.

In block 478, the input_voltage value is compared with the Vbrown value to determine whether a brownout condition exists. According, Vbrown is the brownout threshold. If the input_voltage is less than Vbrown the system loops back. In this way the system monitors the input_voltage by repeatedly measuring it against the Vbrown brownout threshold value. If the input_voltage does drop below Vbrown the system proceeds to section 412.

Figure 4G:
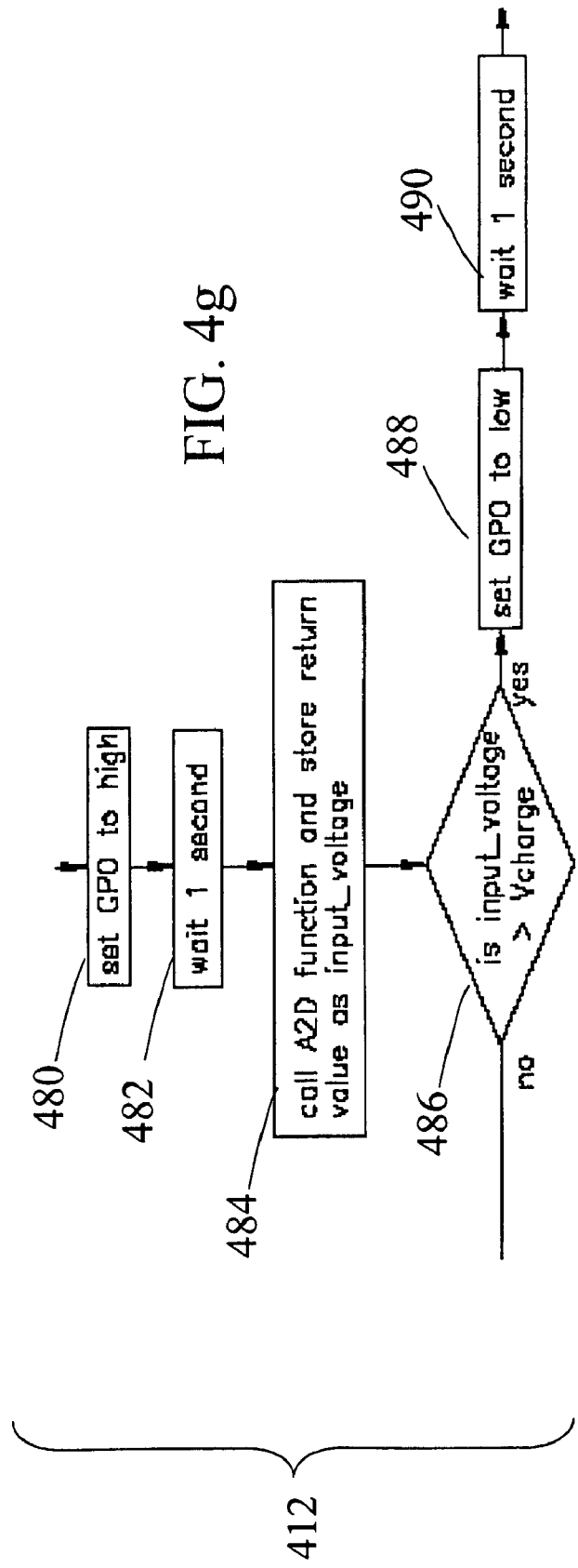

FIG. 4g illustrates the monitor during brownout section 412 of FIG. 4a which monitors the input voltage during a brownout condition. In block 480, the system sets the output GP0 to high. As described above, GP0 is the output indicating when the lighting equipment should be turned on. GP0 may correspond to the driver signal 112 described above. When GP0 is high, the system is signaling for the emergency lighting to be illuminated, when GP0 is low, the system is signaling for the emergency lighting to be turned off. In block 482, the system waits a short period.

In block 484, the system again calls the A2D function and stores the return as input_voltage. In block 486, the input_voltage value is compared with the Vcharge value to determine whether a brownout condition still exists. According, Vcharge is a threshold level that is above the Vbrown brownout threshold level and is used to ensure that the line voltage is sufficient to sustain the charger circuitry. If the input_voltage is lower than the Vcharge value the system loops back to 480. In this way the system monitors the input_voltage during a brownout by repeatedly comparing it against the Vcharge value. If the input_voltage does rise above Vcharge, the system sets GP0 to low in block 488, waits a short amount of time in block 490, then returns to section 410, which monitors the input voltage during non-brownout conditions.

Figure 5A:
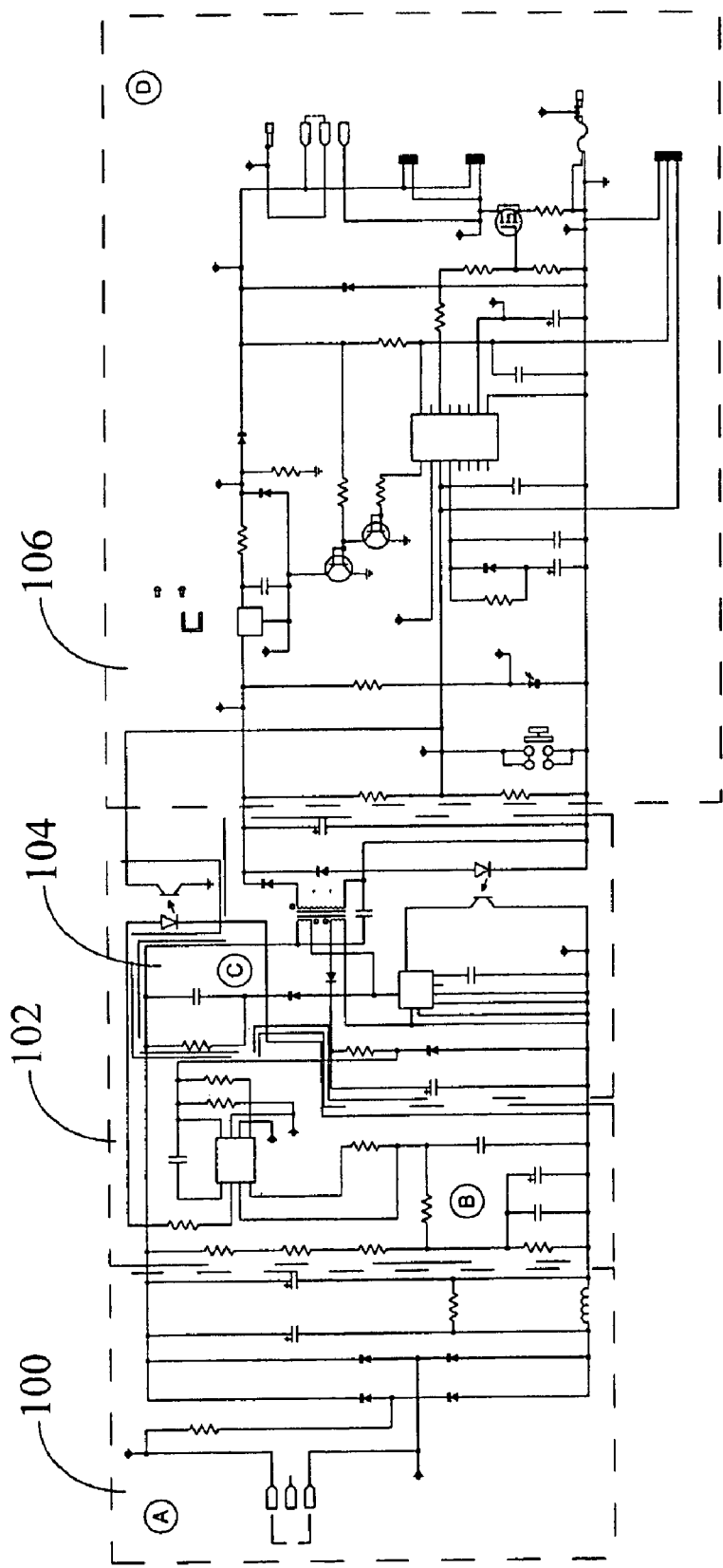
FIGS. 5a-e illustrate a circuit diagram of a system in accordance with one embodiment of the present invention.

FIG. 5a-e illustrate a circuit diagram of one embodiment of the present invention. The circuit shown in FIG. 5a is comprised of essentially four functional components each of which is separately shown in FIGS. 5b-5e. These four components also correspond to the four function components shown in FIG. 1: an input voltage interface 100, a switch mode power converter 104, a brownout detection 102 component, and a battery charging and lighting control 106 component.

Figure 5B:
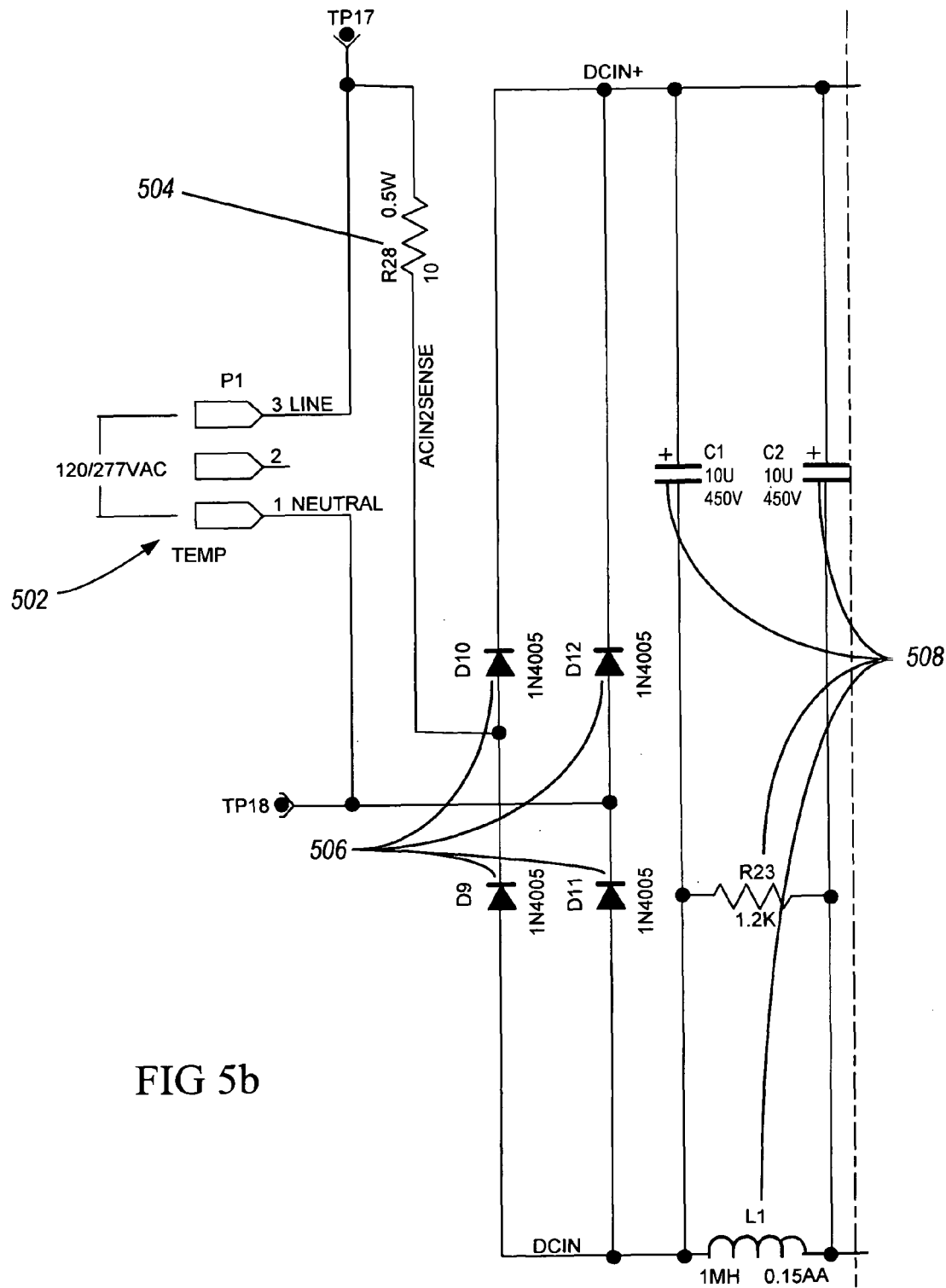

FIG. 5b illustrates the input voltage interface 100, which provides rectification and filtering on the input voltage. The input voltage interface 100 of this embodiment is composed of the AC line voltage connecter 502 which is rated for 277 Vrms, a fusible, flameproof resister 504, four bridge rectifier diodes 506, rated 600V peak repetitive reverse voltage, and a π filter 508. The AC input is rectified with the bridge rectifier diodes 506 and smoothed with the π filter 508. In addition, the fusible resistor 504 combined with the π filter 508 allows the system to meet FCC class B conducted emission standard EN550022 B (CISPR22 B).

Figure 5C:
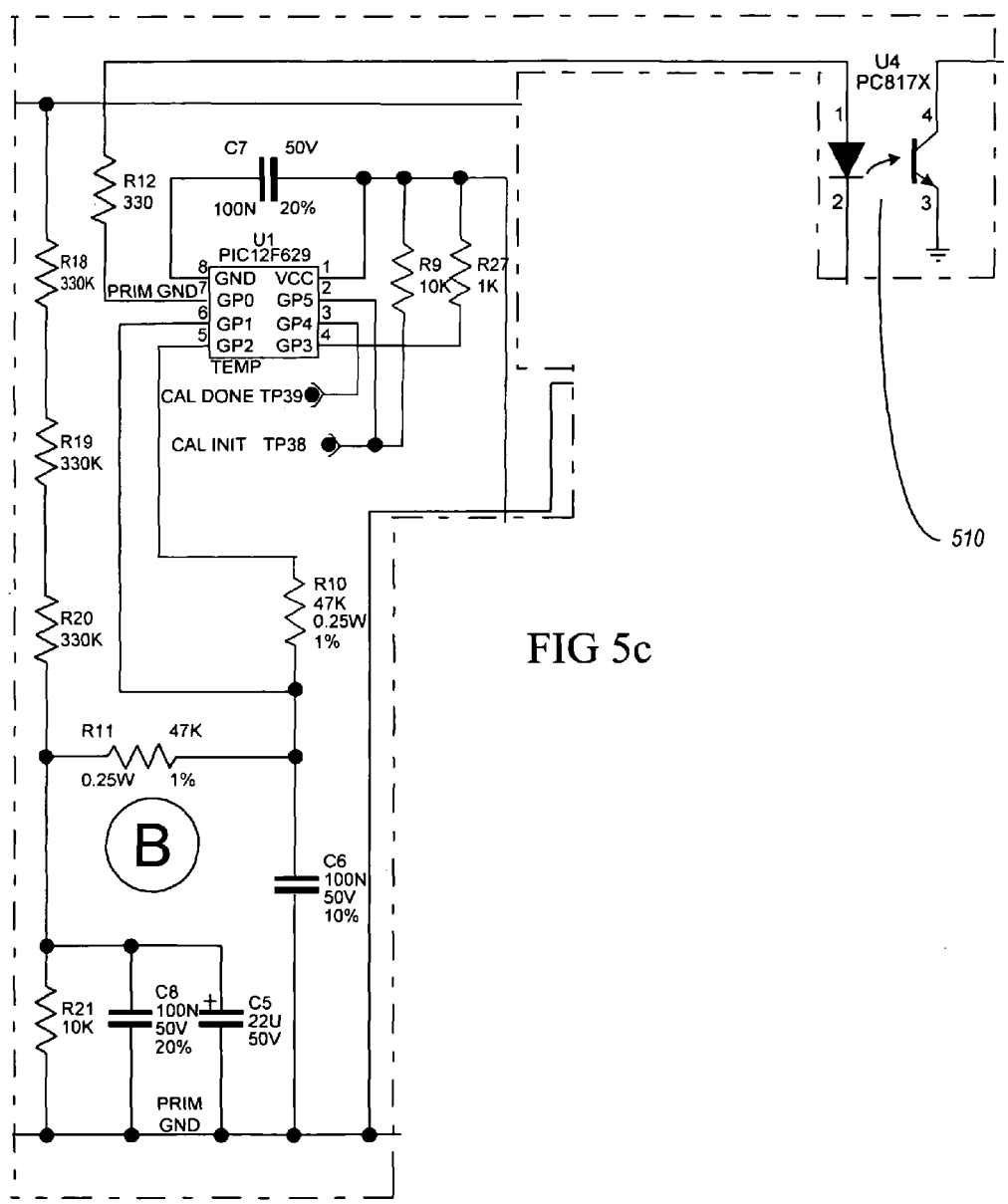

FIG. 5c illustrates the brownout detection 102 component of FIG. 5a and is similar to the brownout detection component shown in FIG. 2 and described above. The circuitry provides an accurate and reliable way of detecting a brownout states for multiple nominal input voltages. If a brownout condition is detected, the brownout detection 102 component sends a drive signal to an optocoupler 510. The transistor side of the optocoupler receives this signal. The use of optocoupler 510 allows the brownout detection component to be electrically isolated from the battery charging and lighting control 106 component.

Figure 5D:
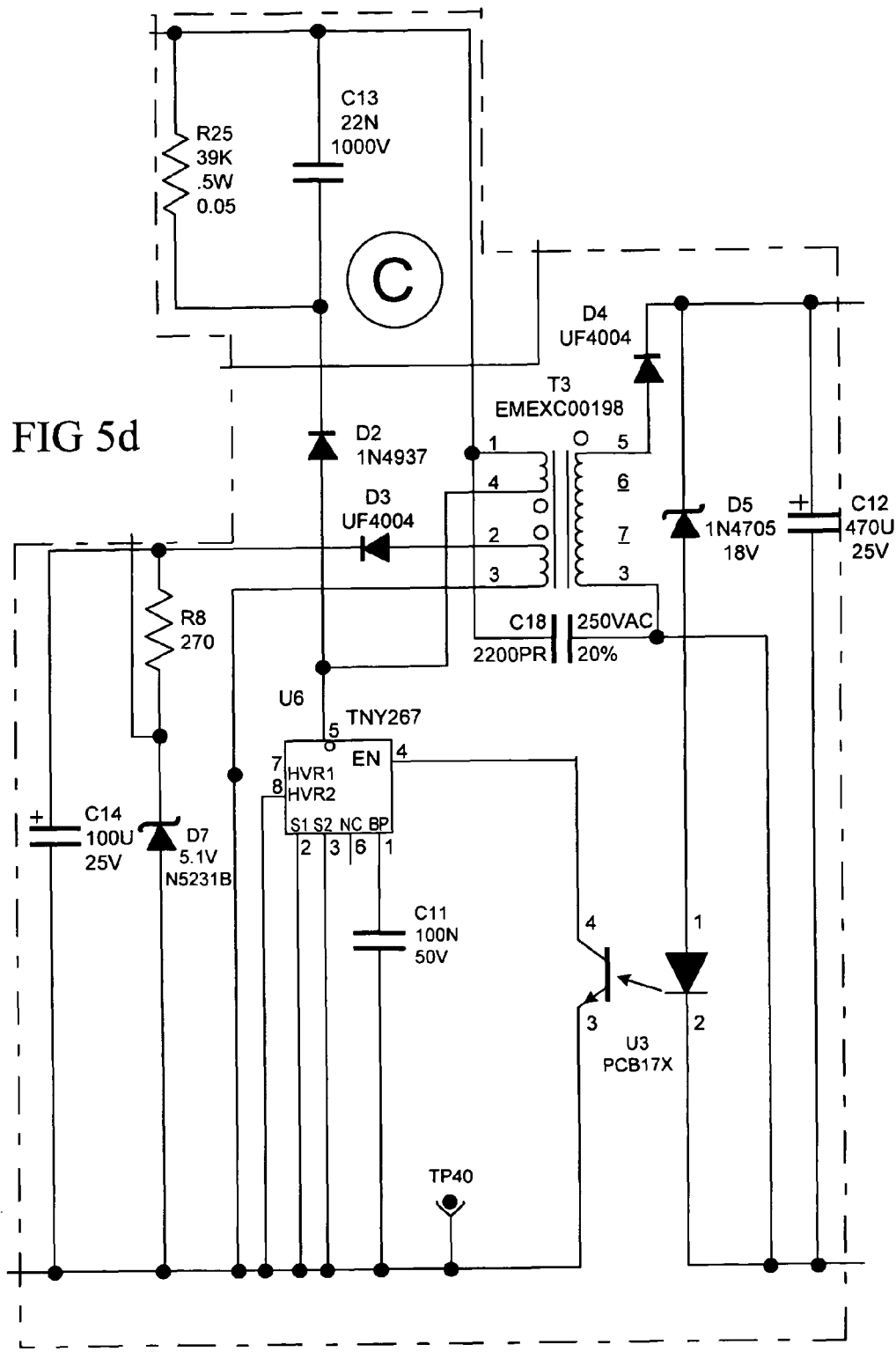

FIG. 5d illustrates the use of a switch mode power converter 104 in an emergency lighting system capable of brownout detection. Specifically, the circuitry illustrates the widely used new family universal input flyback type switch mode power supplies. Unlike the PWM controller, this devise uses a simple ON/OFF feedback control to regulate the output voltage while the input rectified and filtered voltage can vary over a wide range from 85 VAC to 305 VAC. The output voltage of this regulator is based on the nominal battery voltage, battery cell chemistry, charging technique algorithm and the charger controller. One of the typical output voltages of this power supply is set to 19.2V. This signal is filtered with an electrolytic capacitor and supplied to the battery charging and lighting control 106 component.

Figure 5E:
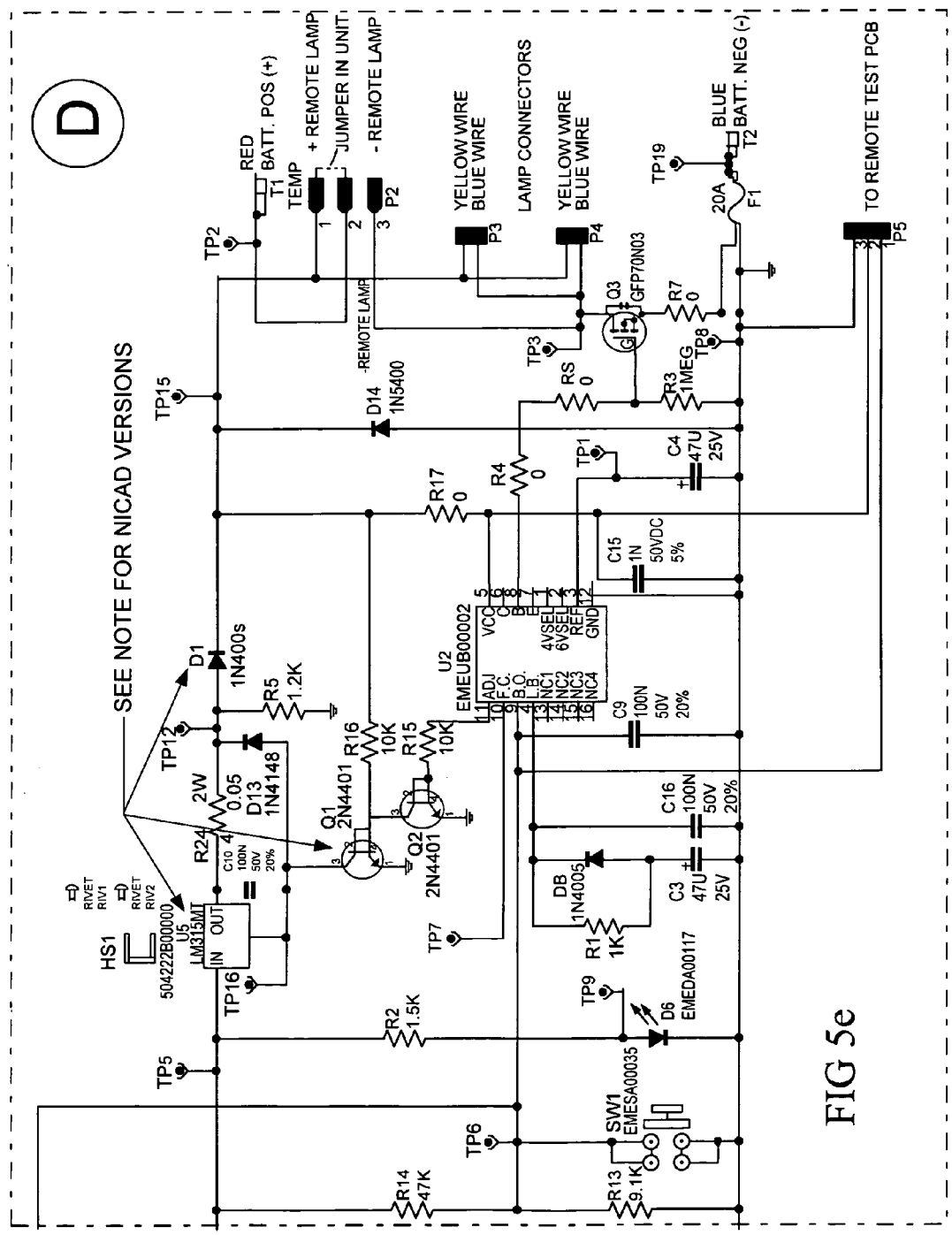

FIG. 5e illustrates a battery charging and lighting control 106 component that may be a part of an emergency lighting system. The main purposes of this circuitry are to control the charging of the battery pack and to enable a DC lamp when the brownout detection 104 component detects a brownout condition. In FIG. 5e, the schematic illustrates a 12 Volt charger that can be configured for Lead-acid and NiCd battery packs.

In one embodiment shown in FIG. 5e circuit incorporates a push button switch, referred to as a remote test interface component, that provides a way for users to test the emergency lighting system during normal operation (non brownout conditions). The battery charging and lighting control 106 shown in FIG. 5 also includes various connectors to simplify use of the system and to provide universality of the system. For example, the system includes battery connectors, lamp connectors, external lamp connectors, and remote test capability.

While this invention has been described in detail with particular reference to preferred embodiments thereof, it will be understood that variations and modifications can be effected within the spirit and scope of the invention as described above and as defined in the appended claims.

What is claimed is:

1. An emergency lighting unit comprising:
   a converter capable of receiving a wide range of input voltages, the wide range of input voltages comprising at least three different input voltages; and a brownout detection component capable of detecting a brownout condition by comparing an input voltage received by the converter with a brownout threshold value determined using a sample actual voltage level of the input voltage, wherein the brownout threshold value has different values where the sample actual voltage level corresponds to different ones of the at least three different input voltages.

2. The system of claim 1 wherein the converter is a switch mode power converter.

3. The system of claim 1 wherein the converter operates over a range between 85 and 305 VAC.

4. The system of claim 1 wherein the converter does not have voltage specific taps.

5. The system of claim 1 wherein the converter accepts one or more odd voltage and frequency inputs.

6. The system of claim 1 wherein the at least three different input voltages comprise:
   an input voltage of approximately 120VAC;
   an input voltage of approximately 220VAC; and
   an input voltage of approximately 277VAC.

7. An emergency lighting unit comprising:
   a converter receiving an input voltage and capable of receiving a wide range of input voltages; and
   a brownout detection component:
      determining a brownout threshold value using a sample actual voltage level of the input voltage, wherein different brownout threshold values are determined for different values of the sample actual voltage level of the input voltage; and
      detecting a brownout by comparing the input voltage with the brownout threshold value.

8. The system of claim 7 wherein the detection component determines a different brownout threshold value for each of:
   an input voltage of approximately 120VAC;
   an input voltage of approximately 220VAC; and
   an input voltage of approximately 277VAC.

9. The system of claim 7 wherein the converter is a switch mode power converter.

10. The system of claim 7 wherein the converter operates over an input voltage range between 85 and 305 VAC to determine the brownout threshold value based on the input voltage.

11. The system of claim 7 wherein the converter does not have voltage specific taps.

12. The system of claim 7 wherein the converter accepts one or more odd voltage and frequency inputs.

* * * * *